May 13, 1924.
L. RAVIER
LOCK NUT
Filed Dec. 15, 1920
1,494,129
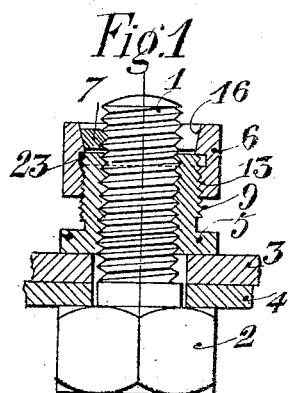
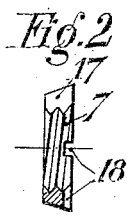
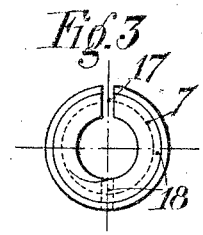
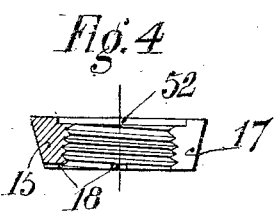
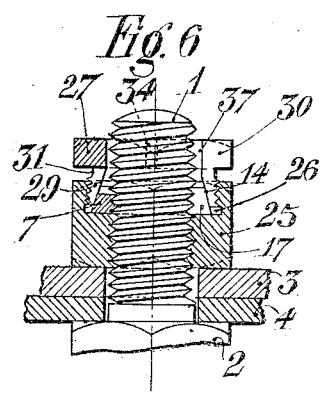
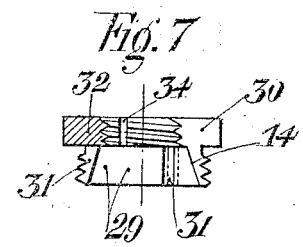
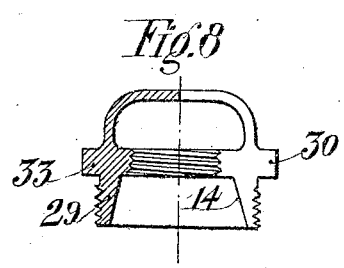
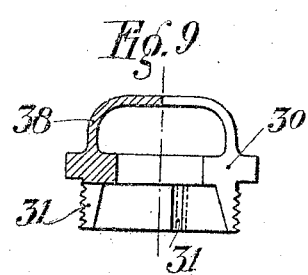
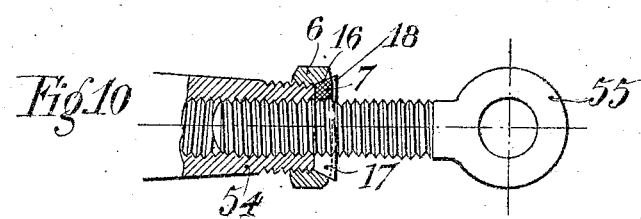
Inventor:
Léopold Ravier Patented May 13, 1924.

1,494,129

UNITED STATES PATENT OFFICE.

LÉOPOLD RAVIER, OF PARIS, FRANCE.

LOCK NUT.

Application filed December 15, 1920. Serial No. 430,813.

*To all whom it may concern:*

Be it known that I, Léopold Ravier, a citizen of the Republic of France, residing at Paris, France, have invented certain new and useful Improvements in Lock Nuts, of which the following is a specification.

My invention relates to improvements in lock-nuts.

The lock-nut according to my invention essentially consists in the combination of a nut, a counter-nut in engagement with the nut, an extensible conical ring screwed onto the threaded stem of a fastening member, such as a bolt, and in engagement with a conical surface of the counter-nut, the said ring being independent of the nut.

In the preferred form of my invention, the counter-nut screws onto the nut; an extensible conical ring is screwed onto the threaded stem of a fastening member, such as a bolt, and is in engagement with a conical surface of the counter-nut; the said ring is independent of the nut.

Various embodiments in accordance with my invention are shown, by way of example, on the drawing herewith, in which Fig. 1 is a sectional view of one embodiment of my invention; Figs. 2 and 3 are respectively a section and a plan view of an extensible conical ring used in the embodiment shown in Fig. 1; Fig. 4 is section of a modified ring; Fig. 5 is an elevation of a washer adapted for use in connection with the embodiment shown in Fig. 1; Fig. 6 is a similar view as Fig. 1 showing a modification of the preferred form; Fig. 7 is a section through a counter-nut adapted for use in connection with the construction shown in Fig. 6; Figs. 8 and 9 are sections through modified counter-nuts adapted to be substituted for that shown in Fig. 7; Fig. 10 is a section through the preferred embodiment of my invention applied to a stretcher.

Fig. 1 shows a bolt provided with a threaded stem 1 and a head 2 intended to connect any two parts 3 and 4. The lock-nut comprises a nut 5, a counter-nut 6 and an extensible conical ring 7. The lower faceted part of the nut 5 is provided with an extension 9 having exterior threads, either right or left handed, but preferably of a smaller pitch than that of the bolt. The nut 5 is interiorly threaded throughout its length corresponding to the bolt.

The counter-nut 6 is provided with a right or left-handed inner threading 13 corresponding to the threading 9 of the nut 5 and with a conical recess 16 adapted to receive the extensible conical rings 7.

The extensible conical ring 7 (Figs. 2 and 3) has a conical exterior surface the apex angle of which is equal to the apex angle of the conical recess 16. Its inner surface is cylindrical and throughout its extent is threaded corresponding to the bolt 1. The ring 7 is split by a radial saw cut 17. The resiliency of the ring can be increased by making upon its circumference a number of partial radial saw cuts, i. e., cuts which penetrate the ring through a portion only of its thickness. The one or the other of the two bases of the ring 7 can be provided with a certain number of notches, such as shown at 18, or other cavities intended to accommodate a special key for the screwing operation.

In certain cases, and particularly in that shown in Fig. 6, one can replace the extensible conical ring 7 of Figs. 2 and 3, with an extensible conical ring, the inner surface of which is bored throughout its length.

The special form 15 of the extensible conical ring shown in Fig. 4 is threaded for a portion of its extent corresponding to the threads of the bolt 1 and terminates with a board recess 52.

The use of the device shown in Fig. 1 is as follows:

One screws the nut 5 onto the threaded stem 1. After tightening, the threads 9 and 13 being right-handed threads, one screws the counter-nut 6 upon the nut 5 until the shoulder 23 bears against the upper face of the nut 5. Then, one screws on the ring 7 until it is locked upon the counter-nut 6. The threads of this ring will strongly lock those of the bolt and will prevent unscrewing.

When the threads 9 and 13 are left-handed, the operation is the same.

In the embodiment just described, one can, without inconvenience, eliminate the shoulder 23 of the counter-nut 6. The lower face of the extensible conical ring 7 can either come or not come in contact with the upper face of the nut 5.

One can also compress between the counter-nut 6 and the base of the nut 5 a resilient washer *a* (Fig. 5) provided with inwardly bent ends so as not to damage the parts in contact.

In this latter case, it suffices to lock the threads of the ring 7 on those of the bolt 1 to retain the nut 5 and to unscrew the counter-nut 6, which will strongly press the extensible ring 7 onto the threaded stem 1 of the bolt and also prevent any untimely unscrewing of the device. The operation is the same, whether the threads 9 and 13 are right or left-handed.

Fig. 6 shows a modification of the preferred embodiment of my invention. In this modification, the nut 25 screwed upon the threaded stem 1 of the bolt, has in its upper portion a cylindrical recess 26, the inner face of which is provided at will either with right-handed or left-handed threads, preferably of a smaller pitch than that of the bolt. An extensible conical ring 7 is screwed upon the bolt 1 and is located in the said recess 26.

The counter-nut 27 has a bore 37 with a diameter greater than that of the stem 1 of the bolt. This counter-nut is provided with an extension 29 which with its threaded outer surface (right- or left-hand threads) engages the corresponding threads of the cylindrical surface of the recess 26. This extension is provided with an inner conical surface 14 the angle of which is equal to the angle of the cone of the ring 7.

The counter-nut 27 is made extensible by a radial saw-cut 30, which splits the nut through its entire length. The resiliency of this counter-nut can be increased by a certain number of radial saw-cuts 34 provided either in the head of the counter-nut or at 31 in the extension 29 of this nut, or by a suitable combination of these saw-cuts. The counter-nut 27 however, can be equally well rendered elastic by only making radial saw-cuts 31 in the cylindrical part 29.

In the use of this device, one screws the nut 25 onto the stem 1 of the bolt. After tightening, one screws the extensible conical ring 7 until it bears against the nut 25 in the recess 26. Then, the extensible counter-nut 27 is screwed in engagement with the threads of the inner cylindrical surface of the recess 26 until these parts are locked.

The angles of the cones being such as above described, the threaded extension 29 of this counter-nut coming in engagement with its lower conical portion 14 with the extensible conical ring 7, expands forcing its threads into those of the recess 26. At the same time, this extension compresses the ring 7, the threads of which strongly engage those of the bolt, thereby making the device impossible to unscrew no matter in what position.

The counter-nut 27 of Fig. 6 can be replaced by the counter-nut 32 of Fig. 7, whose head is provided with interior threads corresponding to those of the bolt, and the resiliency of which is obtained by all the means described in the case of Fig. 6. The outer threading of the extension 29 as well as the corresponding threading of the recess 26 provided at the upper portion of the nut 25 must correspond to the pitch of the bolt-thread and must be only a right-handed thread.

All the threadings of the nut, of the counter-nut and of the stem of the bolt must be of the same pitch, and must suitably correspond. The manner of use is the same as in connection with the device shown in Fig. 6.

The nuts above described may have any desired outer shape. According to the various uses, certain counter-nuts may have special forms; for instance, one can replace the counter-nut 32 of Fig. 7 with a hooded counter-nut 33 (Fig. 8). This latter counter-nut can be made extensible by any of the above described ways, for instance a saw-cut 30.

One can also replace the counter-nut 31 of Fig. 6 with a counter-nut 38 as shown in Fig. 9, which counter-nut can also be made extensible by any of the above described ways, such as saw-cuts 30 and 31.

All these types of unscrewable nuts provided with right-hand threads have numerous uses in all the industries and can be reproduced, in a similar manner with left-hand threads. They are applicable to bolts whatever their shape and to any screw-threaded part of machinery, to screws, to shafting journals for laying fish-plates, to motor-car brake rods, to stretching devices, coupling boxes and so forth.

Fig. 10 shows, by way of example, an application of the preferred embodiment of my invention to stretchers. The central shank 55 is tapped with a right-hand thread and is engaged in the central tapped mortise of the box 54 of the stretcher. A counter-nut 6 like the one shown in Fig. 1 and provided with a conical recess 16 is screwed upon the outer left-hand threads of the box 54. An extensible conical ring 7 (Figs. 2 and 3) is screwed onto the threaded shank 55. After having tensioned the stretcher by causing the rotation of the box 54, one screws said ring 7 in such a manner, that its base comes in close proximity to the edge of the said box 54, or in direct contact therewith. In unscrewing the counter-nut 6, one obtains an unscrewable whole by the action one upon the other of the two conical surfaces of the counter-nut 6 and of the ring 7, which action determines the wedging of the threads of the extensible conical ring 7 on the threads of the shank 55.

I claim as my invention:

1. In lock-nut devices the combination of a nut, a counter-nut in engagement with the said nut, an extensible conical ring mounted on the stem of a fastening member, such as a bolt and in engagement with a conical surface of the said counter-nut, the said ring being independent of the said nut.

2. In lock-nut devices the combination of a nut, a counter-nut held by threads in engagement with the said nut, an extensible conical ring mounted on the stem of a fastening member, such as a bolt, and in engagement with a conical surface of the said counter-nut, the said ring being independent of the said nut.

3. In lock-nut devices, the combination of a nut, a counter-nut screwed upon the threaded outer surface of the said nut, an extensible conical ring mounted on the stem of a fastening member, such as a bolt, and in engagement with a conical surface of the said counter-nut, the said ring being independent of the said nut.

4. In a lock-nut device, the combination with the stem of a fastening member, such as a bolt, of a nut screwed onto the said stem, an extensible conical ring screwed onto the said stem independently of the said nut, a counter-nut interposed between the said nut and the said conical ring, the said counter-nut being screwed upon the said nut, and being in engagement by a conical surface with a conical surface of the said ring.

5. In lock-nut devices, the combination of a nut, a counter-nut held in engagement by threads with the said nut, an extensible conical ring mounted on the stem of a fastening member, such as a bolt, and in engagement with a conical surface of the said counter-nut, the said ring being independent of the said nut, and elastic members being tightly pressed between the said nut and said counter-nut.

In testimony whereof I have affixed my signature in presence of two witnesses.

LÉOPOLD RAVIER.

Witnesses:
 LOUIS GARDET,
 HENRI MONIN.